(12) United States Patent
Liu et al.

(10) Patent No.: US 12,111,453 B1
(45) Date of Patent: Oct. 8, 2024

(54) DIFFERENTIAL DARK-FIELD CONFOCAL MICROSCOPIC MEASUREMENT APPARATUS AND METHOD BASED ON POLARIZED VECTOR LIGHT BEAM

(71) Applicant: Harbin Institute of Technology, Harbin (CN)

(72) Inventors: Jian Liu, Harbin (CN); Chenguang Liu, Harbin (CN); Chongliang Zou, Harbin (CN); Zijie Hua, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/424,711

(22) Filed: Jan. 26, 2024

(30) Foreign Application Priority Data

Mar. 15, 2023 (CN) .......................... 202310247164.3

(51) Int. Cl.
  *G02B 21/00* (2006.01)
  *G02B 21/18* (2006.01)

(52) U.S. Cl.
  CPC ..... *G02B 21/0032* (2013.01); *G02B 21/0036* (2013.01); *G02B 21/006* (2013.01); *G02B 21/0068* (2013.01); *G02B 21/18* (2013.01)

(58) Field of Classification Search
  CPC ............ G02B 21/0032; G02B 21/0036; G02B 21/006; G02B 21/0068; G02B 21/18
  See application file for complete search history.

(56) References Cited

U.S. PATENT DOCUMENTS 10,591,356 B2 *  3/2020  Seyfried ............ G02B 21/0032
11,914,129 B2 *  2/2024  Ha ........................ G02B 21/008
(Continued)

FOREIGN PATENT DOCUMENTS

CN    107851589 A    3/2018
CN    111247418 A    6/2020
(Continued)

OTHER PUBLICATIONS

Li, H. Y., L. Y. Qu, and Z. J. Hua. "Deep learning based fluorescence microscopy imaging technologies and applications." Laser and Optoelectronics Progress 58.18 (2021): 1811007.

*Primary Examiner* — Mustak Choudhury
(74) *Attorney, Agent, or Firm* — IPro, PLLC

(57) ABSTRACT

Disclosed are a differential dark-field confocal microscopic measurement apparatus and method based on a polarized vector light beam. The apparatus includes a vector polarized illumination light generation module, a light beam scanning illumination module and a differential dark-field confocal imaging module; a half wave plate and a vortex wave plate are regulated to generate radially polarized signal light and azimuthally polarized signal light respectively, and an acousto-optic modulator is controlled to modulate light beams into a pulse form, so that the radially polarized signal light and the azimuthally polarized signal light alternately illuminate during the same period, both of which have a time occupation ratio of 50%, separately. Difference values of scattering signals under separate illumination of the radially polarized signal light and the azimuthally polarized signal light are analyzed, and super-resolution detection imaging can be performed on the three-dimensional distribution information of defects such as subsurface scratches, and abrasion.

8 Claims, 1 Drawing Sheet

(56) References Cited

U.S. PATENT DOCUMENTS

| | | | | |
|---|---|---|---|---|
| 2003/0107732 A1* | 6/2003 | Sasaki | ............... | G02B 21/16 |
| | | | | 356/417 |
| 2007/0115551 A1* | 5/2007 | Spilman | ............... | G02B 27/286 |
| | | | | 359/489.03 |
| 2009/0011403 A1* | 1/2009 | Smith | ............... | G01N 21/6428 |
| | | | | 427/419.8 |
| 2011/0075254 A1* | 3/2011 | Cui | ............... | G02B 6/1226 |
| | | | | 359/370 |
| 2015/0145981 A1* | 5/2015 | Anhut | ............... | G01N 21/6458 |
| | | | | 348/80 |
| 2016/0209270 A1* | 7/2016 | Seyfried | ............... | G02B 21/0032 |
| 2019/0162662 A1* | 5/2019 | Raphael | ............... | G01N 21/554 |
| 2022/0187584 A1* | 6/2022 | Ha | ............... | G02B 21/0068 |

FOREIGN PATENT DOCUMENTS

| | | |
|---|---|---|
| CN | 113960010 A | 1/2022 |
| CN | 113984771 A | 1/2022 |
| WO | 2021143527 A1 | 7/2021 |

\* cited by examiner

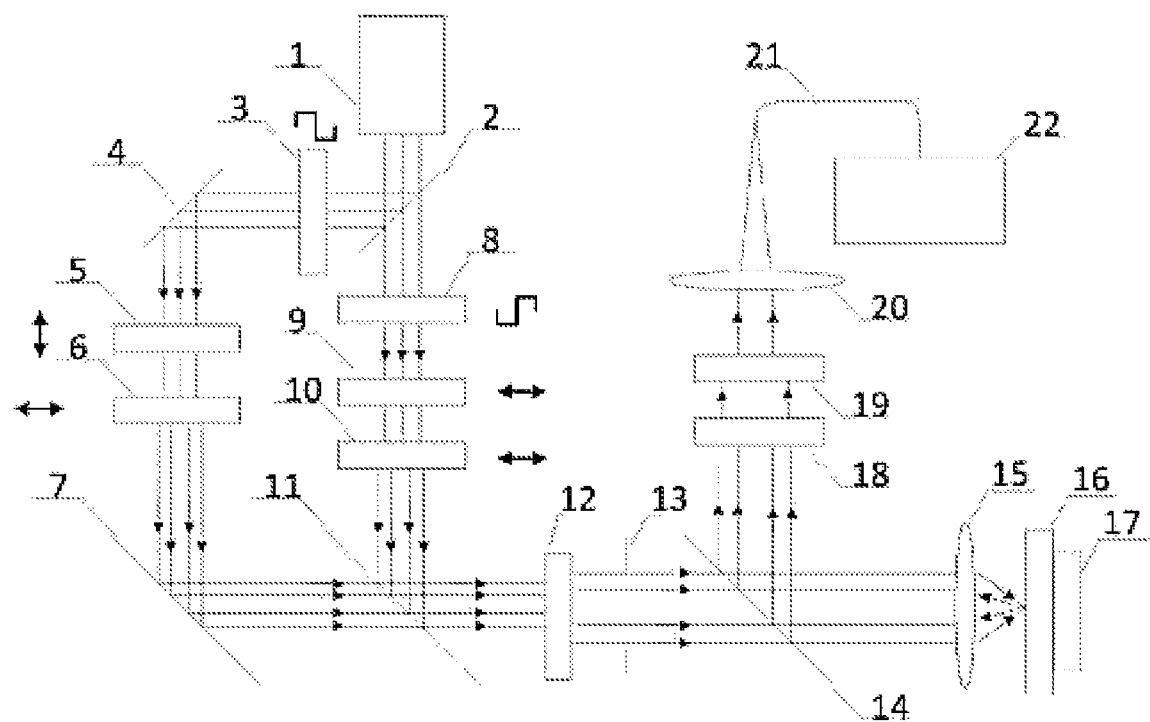

DIFFERENTIAL DARK-FIELD CONFOCAL MICROSCOPIC MEASUREMENT APPARATUS AND METHOD BASED ON POLARIZED VECTOR LIGHT BEAM

TECHNICAL FIELD

The present disclosure belongs to the technical field of optical precision measurement, and mainly relates to a differential dark-field confocal microscopic measurement apparatus and method based on a polarized vector light beam. A half wave plate and a vortex wave plate are regulated to generate radially polarized light and azimuthally polarized light respectively, and an acousto-optic modulator is controlled to modulate light beams into a pulse sequence, so that the radially polarized illumination and the azimuthally polarized illumination alternately illuminate during the same period, both of which have a time occupation ratio of 50%, separately. Difference values of scattering signals under separate illumination of the radially polarized light and the azimuthally polarized light are analyzed, and super-resolution detection imaging can be performed on the three-dimensional distribution information of defects such as subsurface scratches, abrasion, subsurface cracks, and bubbles.

BACKGROUND

High-performance optical elements and optical materials are widely used in precision instrument manufacturing and significant optical engineering research, and are the foundation of the performance of an optical system. Therefore, they play an important role in high-resolution precision detection of defects in mechanical structures, chemical composition and lattice structures on surfaces and subsurfaces of the optical elements and optical materials. Phase defects of an optical element can cause incident light beams locally form a focused light field, so that the optical element is locally overheated, suffers irreversible damage.

Enjoying such advantages as good optical tomography capability, relatively high imaging resolution, and relatively high imaging contrast caused by a dark background, the dark-field confocal microscopic measurement technology has become an important means for nondestructive three-dimensional detection of the optical elements. Ordinary optical dark-field confocal microscopic measurement technology can only detect geometrical defects in a sample, such as scratches, and bubbles, but it has insufficient imaging resolution, making it difficult to realize effective detection of defects with sizes below 250 nm.

In order to characterize defect characteristics of the optical elements and materials more comprehensively, and to realize detection more accurately, the present disclosure provides a differential dark-field confocal microscopic measurement apparatus and method based on a polarized vector light beam, which adopt vortex scattering dichroism spectrum analysis to obtain chirality information of a micro-nano structure while utilizing dark-field confocal under the illumination of the polarized vector light beam, and also make use of difference values of scattering signals under separate illumination of the radially polarized light and the azimuthally polarized light, so that lateral resolution is improved, providing a means for high-resolution detection of surface and subsurface defects.

SUMMARY

A brief overview of the present disclosure is given below in order to provide a basic understanding of some aspects of the present disclosure. It should be understood that such overview is not an exhaustive overview of the present disclosure. It is not intended to identify key or important parts of the present disclosure, nor to limit the scope of the present disclosure. Its purpose is merely to present some concepts in a simplified form as a prelude to a more detailed description to be discussed later.

The present disclosure provides a differential dark-field confocal microscopic measurement apparatus and method based on a polarized vector light beam. Compared with the prior art, the apparatus and method solve the bottlenecks low imaging resolution and inability to achieve effective detection of small defects by the ordinary dark-field confocal technology, so that the imaging resolution is improved to some extent.

In order to achieve the above objective, the present disclosure adopts the following technical solution:

the present disclosure provides a differential dark-field confocal microscopic measurement apparatus based on vector polarized light beam illumination, and the apparatus includes a vector polarized illumination generation module, a light beam scanning illumination module and a differential dark-field confocal imaging module;

the vector polarized illumination generation module includes the following components in sequence according to a direction of light propagation: a laser and a first non-polarizing beam splitter, where the first non-polarizing beam splitter divides a laser propagation path into two paths, the first path involves the following components in sequence according to a direction of light propagation: a first acousto-optic modulator, a first reflecting mirror, a first half-wave plate, a first vortex wave plate and a second reflecting mirror and a second non-polarizing beam splitter; the second path involves the following components in sequence according to a direction of light propagation: a second acousto-optic modulator, a second half-wave plate, a second vortex wave plate and a second non-polarizing beam splitter; and the second non-polarizing beam splitter combines the first and second laser beams and propagates them to the light beam scanning illumination module;

the light beam scanning illumination module includes the following components in sequence according to a direction of light propagation: a beam expander, an aperture diaphragm, a third non-polarizing beam splitter, an objective lens and a sample to be detected, where the third non-polarizing beam splitter divides the laser light into two paths, one path thereof is propagated to the sample to be detected through the objective lens, and the other path thereof is propagated to the differential dark-field confocal imaging module; and the differential dark-field confocal imaging module includes the following components in sequence according to a direction of light propagation: a third vortex wave plate, a polarizing plate, a focusing lens, a single-mode optical fiber, and a PMT detector.

Further, the laser emits linearly polarized laser, the linearly polarized laser passes through the first non-polarizing beam splitter, and is modulated by the first acousto-optic modulator in the first half of each light field illumination cycle, in which case, the first acousto-optic modulator allows light beams to pass through, the second acousto-optic modulator prevents the light beams from passing through, so that only radially polarized light generated by the first half-wave plate and the first vortex wave plate achieves the illumination during the period, the first half-wave plate is regulated to make the polarization direction of the linearly polarized light perpendicular to the 0-level fast axis direction of the first vortex wave plate, and the radially polarized light is emitted. The generated radially polarized light achieves effective illumination only in the first half of each cycle;

Further, the laser emits linearly polarized laser, the linearly polarized laser passes through the first non-polarizing beam splitter, and is modulated by the second acousto-optic modulator in the second half of each light field illumination cycle, in which case, the second acousto-optic modulator allows light beams to pass through, the first acousto-optic modulator prevents the light beams from passing through, so that only azimuthally polarized light generated by the second half-wave plate and the second vortex wave plate achieves the illumination during the period, the second half-wave plate is regulated to make the polarization direction of the linearly polarized light parallel to the 0-level fast axis direction of the second vortex wave plate, and the azimuthally polarized light is emitted. The generated azimuthally polarized light achieves effective illumination only in the second half of each cycle.

Further, the emitting diameter is matched with an entrance aperture of the objective lens by regulating the magnification of the beam expander and the aperture size of the aperture diaphragm.

Further, the sample signal light of the sample to be detected is collected by the objective lens and passes through the third non-polarizing beam splitter after being returned through the original illumination light paths.

Further, the third vortex wave plate regulates emitting light beams to be the linearly polarized light, reflected light on the surface of the sample is removed through the polarizing plate, and only scattered light carrying the information of the sample to be detected is allowed to pass through the focusing lens, and to enter the single-mode optical fiber and the PMT detector for collection and detection.

Further, during the same cycle, the PMT detector collects the scattering signals under the illumination of the radially polarized light in the first half cycle, and collects the scattering signals under the illumination of the azimuthally polarized light in the second half cycle. Super-resolution dark-field imaging results are obtained by identifying difference on the signals collected in each cycle.

The present disclosure provide a differential dark-field confocal microscopic measurement method based on a polarized vector light beam, and the method is implemented by the differential dark-field confocal microscopic measurement apparatus based on a polarized vector light beam, including the following specific steps:

step a. emitting linearly polarized laser from the laser, having the linearly polarized laser passed through the first non-polarizing beam splitter, and modulated by the first acousto-optic modulator in the first half of each light field illumination cycle, in which case, the first acousto-optic modulator allows light beams to pass through, the second acousto-optic modulator prevents the light beams from passing through, so that only radially polarized light generated by the first half-wave plate and the first vortex wave plate achieves the illumination during the period, the first half-wave plate is regulated to make the polarization direction of the linearly polarized light perpendicular to the 0-level fast axis direction of the first vortex wave plate, and the radially polarized light is emitted. The generated radially polarized light achieves effective illumination only in the first half of each cycle;

step b. emitting linearly polarized laser from the laser, having the linearly polarized laser passed through the first non-polarizing beam splitter, and modulated by the second acousto-optic modulator in the second half of each light field illumination cycle, in which case, the second acousto-optic modulator allows light beams to pass through, the first acousto-optic modulator prevents the light beams from passing through, so that only azimuthally polarized light generated by the second half-wave plate and the second vortex wave plate achieves the illumination during the period, the second half-wave plate is regulated to make the polarization direction of the linearly polarized light parallel to the 0-level fast axis direction of the second vortex wave plate, and the azimuthally polarized light is emitted. The generated azimuthally polarized light achieves effective illumination only in the first half of each cycle;

step c. having the emitting diameter matched with the entrance aperture of the objective lens by regulating the magnification of the beam expander and the aperture size of the aperture diaphragm;

step d. having the polarized vector light passed through the third non-polarizing beam splitter and being incident on the objective lens to form a focused light spot on the sample to be detected, and realizing the beam scanning of the sample to be detected by driving the three-dimensional moving stage;

step e. having the sample signal light, after being returned through the original illumination light paths, collected by the objective lens and passed through the third non-polarizing beam splitter, and having the sample signal light regulated to be the linearly polarized light through the third vortex wave plate;

step f. realizing removal of reflected light on the surface of the sample by controlling the polarization direction of the polarizing plate, only allowing the scattered light carrying the information of the sample to be detected to pass through the focusing lens, and to enter the single-mode optical fiber and the PMT detector for collection and detection;

step g. during the same cycle, the PMT detector collects the scattering signals under the illumination of the radially polarized light in the first half cycle, and collects the scattering signals under the illumination of the azimuthally polarized light in the second half cycle; and step h. identifying differences on the scattering signals recorded by the PMT detector under the illumination of the radially polarized light and the azimuthally polarized light to obtain differential scattering signals.

Beneficial Effects:

first, ordinary dark-field measurement of the sample can be realized according to the scattering signals collected by single vector polarized illumination light, and difference values under separate illumination of the radially polarized signal light and the azimuthally polarized signal light are analyzed, so that the lateral resolution can be effectively improved; and second, the apparatus adopts the Gaussian beams emitted by the laser to illuminate, which avoids the requirement of the traditional dark-field confocal measurement that the entrance aperture of an objective lens should be greater than the inner diameter of annular light, and it is conducive to the use of the objective lens with a large numerical aperture for high-resolution dark-field imaging.

BRIEF DESCRIPTION OF THE DRAWINGS

FIG. 1 is a schematic structural diagram of a differential dark-field confocal microscopic measurement apparatus based on a polarized vector light beam provided in the present disclosure.

In the accompanying drawings: 1—laser; 2—first non-polarizing beam splitter; 3—first acousto-optic modulator; 4—first reflecting mirror; 5—first half-wave plate; 6—first vortex wave plate; 7—second reflecting mirror; 8—second acousto-optic modulator; 9—second half-wave plate; 10—second vortex wave plate; 11—second non-polarizing beam splitter; 12—beam expander; 13—aperture diaphragm; 14—third non-polarizing beam splitter; 15—objective lens; 16—sample to be detected; 17—three-dimensional moving stage; 18—third vortex wave plate; 19—polarizing plate; 20—focusing lens; 21—single-mode optical fiber; and 22—PMT detector.

DETAILED DESCRIPTIONS OF THE EMBODIMENTS

Exemplary embodiments of the present disclosure will be described below in conjunction with the accompanying drawings. For the sake of clarity and conciseness, not all features of the actual implement are described in the description. However, it should be understood that many implementation-specific decisions must be made in the process of developing any such practical embodiment, so as to achieve specific objectives of the developers, such as meeting those restrictions associated with the system and the business, and those restrictions vary with the implementation. It should be also understood that although the development work is likely to be very complex and time-consuming, such development work is merely a routine task for those skilled in the art benefiting from the disclosure of the present disclosure.

It should be further noted that, in order to avoid obscuring the present disclosure due to unnecessary details, only the structure and/or processing steps closely related to the solution according to the present disclosure are shown in the accompanying drawings, while other details that have little to do with the present disclosure are omitted.

Embodiment 1: as shown in FIG. 1, the present embodiment provide a differential dark-field confocal microscopic measurement apparatus based on a polarized vector light beam, which is configured for improving the resolution of dark-field measurement.

The apparatus includes a vector polarized illumination light generation module, a light beam scanning illumination module and a differential dark-field confocal imaging module;

the vector polarized illumination light generation module includes the following components in sequence according to a direction of light propagation: a laser 1, a first non-polarizing beam splitter 2, a first acousto-optic modulator 3, a first reflecting mirror 4, a first half-wave plate 5, a first vortex wave plate 6 and a second reflecting mirror 7, a second acousto-optic modulator 8, a second half-wave plate 9, a second vortex wave plate 10 and a second non-polarizing beam splitter 11;

the laser 1 emits linearly polarized laser, the linearly polarized laser passes through the first non-polarizing beam splitter 2, and is modulated by the first acousto-optic modulator 3 in the first half of each light field illumination cycle, in which case, the first acousto-optic modulator 3 allows light beams to pass through, the second acousto-optic modulator 8 prevents the light beams from passing through, so that only radially polarized light generated by the first half-wave plate 5 and the first vortex wave plate 6 achieves the illumination during the period, the first half-wave plate 5 is regulated to make a polarization direction of the linearly polarized light perpendicular to a 0-level fast axis direction of the first vortex wave plate 6, and the radially polarized light is emitted. The generated radially polarized light achieves effective illumination only in the first half of each cycle.

The laser 1 emits linearly polarized laser, the linearly polarized laser passes through the first non-polarizing beam splitter 2, and is modulated by the second acousto-optic modulator 8 in the second half of each light field illumination cycle, in which case, the second acousto-optic modulator 8 allows light beams to pass through, the first acousto-optic modulator 3 prevents the light beams from passing through, so that only azimuthally polarized light generated by the second half-wave plate 9 and the second vortex wave plate 10 achieves the illumination during the period, the second half-wave plate 9 is regulated to make a polarization direction of the linearly polarized light parallel to a 0-level fast axis direction of the second vortex wave plate 10, and the azimuthally polarized light is emitted. The generated azimuthally polarized light achieves effective illumination only in the second half of each cycle.

The light beam scanning illumination module includes the following components in sequence according to a direction of light propagation: a beam expander 12, an aperture diaphragm 13, a third non-polarizing beam splitter 14, an objective lens 15 and a sample to be detected 16; and an emitting diameter is matched with an entrance aperture of the objective lens 15 by regulating a magnification of the beam expander 12 and an aperture size of the aperture diaphragm 13, the polarized vector light after passing through the third non-polarizing beam splitter 14 is incident on the objective lens 15, a focused light spot on the sample to be detected 16 is formed, and the beam scanning of the sample to be detected 16 is realized by driving the three-dimensional moving stage 17.

The differential dark-field confocal imaging module includes the following components in sequence according to a direction of light propagation: a third vortex wave plate 18, a polarizing plate 19, a focusing lens 20, a single-mode optical fiber 21, and a PMT detector 22; and after being collected by the objective lens and passing through the third non-polarizing beam splitter 14 after being returned through the original illumination light paths, sample signal light emits the linearly polarized light through the third vortex wave plate 18, reflected light on the surface of the sample is removed through the polarizing plate 19, only scattered light carrying the information of the sample to be detected 16 is allowed to pass through the focusing lens 20, and to enter the single-mode optical fiber 21 and the PMT detector 22 for collection and detection.

More specifically, the laser 1 emits the linearly polarized laser, the linearly polarized laser passes through the first non-polarizing beam splitter 2, and is modulated by the first acousto-optic modulator 3, the first half-wave plate 5 is regulated to make the polarization direction of the linearly polarized light perpendicular to the 0-level fast axis direction of the first vortex wave plate 6, and the radially polarized light is emitted. The generated radially polarized light achieves effective illumination only in the first half of each cycle.

More specifically, the laser 1 emits the linearly polarized laser, the linearly polarized laser passes through the first non-polarizing beam splitter 2, and is modulated by the second acousto-optic modulator 8, the second half-wave plate 9 is regulated to make the polarization direction of the linearly polarized light parallel to the 0-level fast axis direction of the second vortex wave plate 10, and the azimuthally polarized light is emitted. The generated azimuthally polarized light achieves effective illumination only in the first half of each cycle.

More specifically, the emitting diameter is matched with the entrance aperture of the objective lens 15 by regulating the magnification of the beam expander 12 and the aperture size of the aperture diaphragm 13.

More specifically, the reflected light from the sample to be detected 16 is collected by the objective lens 15 and passes through the third non-polarizing beam splitter 14 after being returned through the original illumination light paths.

More specifically, the sample signal light emits the linearly polarized light through the third vortex wave plate 18, reflected light on the surface of the sample is removed through the polarizing plate 19, and only scattered light carrying the information of the sample to be detected 16 is allowed to pass through the focusing lens 20, and to enter the single-mode optical fiber 21 and the PMT detector 22 for collection and detection.

More specifically, during the same cycle, the PMT detector 22 collects the scattering signals under the illumination of the radially polarized light in the first half cycle, and collects the scattering signals under the illumination of the azimuthally polarized light in the second half cycle. Super-resolution dark-field imaging results are obtained by identifying difference on the signals collected in each cycle.

Embodiment 2: the present embodiment provide a differential dark-field confocal microscopic measurement method based on a polarized vector light beam, which is configured for improving the resolution of dark-field measurement. The method includes the following specific steps:

- step a. emitting linearly polarized laser from the laser 1, having the linearly polarized laser passed through the first non-polarizing beam splitter 2 and modulated by the first acousto-optic modulator 3, regulating the first half-wave plate 5 to make a polarization direction of the linearly polarized light perpendicular to a 0-level fast axis direction of the first vortex wave plate 6, and emitting radially polarized light. The generated radially polarized light achieves effective illumination only in the first half of each cycle;
- step b. emitting linearly polarized laser from the laser 1, having the linearly polarized laser passed through the first non-polarizing beam splitter 2 and modulated by the second acousto-optic modulator 8, regulating the second half-wave plate 9 to make a polarization direction of the linearly polarized light parallel to a 0-level fast axis direction of the second vortex wave plate 10, and emitting azimuthally polarized light. The generated azimuthally polarized light achieves effective illumination only in the first half of each cycle;
- step c. having the emitting diameter matched with the entrance aperture of the objective lens 15 by regulating the magnification of the beam expander 12 and the aperture size of the aperture diaphragm 13;
- step d. having the polarized vector light passed through the third non-polarizing beam splitter 14 and being incident on the objective lens 15 to form a focused light spot on the sample to be detected 16, and realizing the beam scanning of the sample to be detected 16 by driving the three-dimensional moving stage 17;
- step e. having the sample signal light, after being returned through the original illumination light paths, collected by the objective lens 15 and passed through the third non-polarizing beam splitter 14, and having the sample signal light regulated to be the linearly polarized light through the third vortex wave plate 18;
- step f. realizing removal of reflected light on the surface of the sample by controlling the polarization direction of the polarizing plate 19, only allowing the scattered light carrying the information of the sample to be detected 16 to pass through the focusing lens 20, and to enter the single-mode optical fiber 21 and the PMT detector 22 for collection and detection;
- step g. during the same cycle, the PMT detector 22 collects the scattering signals under the illumination of the radially polarized light in the first half cycle, and collects the scattering signals under the illumination of the azimuthally polarized light in the second half cycle; and
- step h. identifying differences on the scattering signals recorded by the PMT detector 22 under the illumination of the radially polarized light and the azimuthally polarized light to obtain differential scattering signals.

More specifically, the laser beams emitted by the laser 1 have a wavelength of 400 nm-620 nm.

Although the implementation disclosed in the present disclosure is described as above, the contents thereof are only the implementation adopted to facilitate the understanding of the technical solutions of the present disclosure, and are not intended to limit the present disclosure. Those skilled in the art to which the present disclosure belongs may make any modifications and changes in the form and details of the implementation without departing from the core technical solution disclosed in the present disclosure, but the scope of protection limited by the present disclosure shall still be subject to the scope limited by the appended claims.

The invention claimed is:

1. A differential dark-field confocal microscopic measurement apparatus based on a polarized vector light beam, comprising a vector polarized illumination light generation module, a light beam scanning illumination module and a differential dark-field confocal imaging module; the vector polarized illumination light generation module comprises the following components in sequence according to a direction of light propagation: a laser and a first non-polarizing beam splitter, wherein the first non-polarizing beam splitter divides a laser propagation path into a first path and a second path, the first path involves the following components in sequence according to a direction of light propagation: a first acousto-optic modulator, a first reflecting mirror, a first half-wave plate, a first vortex wave plate and a second reflecting mirror and a second non-polarizing beam splitter; the second path involves the following components in sequence according to a direction of light propagation: a second acousto-optic modulator, a second half-wave plate, a second vortex wave plate and a second non-polarizing beam splitter; and the second non-polarizing beam splitter combines the first and second laser beams, and propagates them to the light beam scanning illumination module; the light beam scanning illumination module comprises the following components in sequence according to a direction of light propagation: a beam expander, an aperture diaphragm, a third non-polarizing beam splitter, an objective lens and a sample to be detected, wherein the third non-polarizing beam splitter divides the laser light into two paths, one path thereof is propagated to the sample to be detected through the objective lens, and the other path thereof is propagated to the differential dark-field confocal imaging module; and the differential dark-field confocal imaging module comprises the following components in sequence according to a direction of light propagation: a third vortex wave plate, a polarizing plate, a focusing lens, a single-mode optical fiber, and a PMT detector.

2. The differential dark-field confocal microscopic measurement apparatus based on a polarized vector light beam according to claim 1, wherein the laser emits linearly polarized laser, the linearly polarized laser passes through the first non-polarizing beam splitter, and is modulated by the first acousto-optic modulator in the first half of each light field illumination cycle, in which case, the first acousto-optic modulator allows light beams to pass through, the second acousto-optic modulator prevents the light beams from passing through, so that only radially polarized light generated by the first half-wave plate and the first vortex wave plate achieves the illumination during the period.

3. The differential dark-field confocal microscopic measurement apparatus based on a polarized vector light beam according to claim 1, wherein the laser emits linearly polarized laser, the linearly polarized laser passes through the first non-polarizing beam splitter, and is modulated by the second acousto-optic modulator in the second half of each light field illumination cycle, in which case, the second acousto-optic modulator allows light beams to pass through, the first acousto-optic modulator prevents the light beams from passing through, so that only azimuthally polarized light generated by the second half-wave plate and the second vortex wave plate achieves the illumination during the period.

4. The differential dark-field confocal microscopic measurement apparatus based on a polarized vector light beam according to claim 1, wherein the emitting diameter is matched with an entrance aperture of the objective lens by regulating the magnification of the beam expander and an aperture size of the aperture diaphragm.

5. The differential dark-field confocal microscopic measurement apparatus based on a polarized vector light beam according to claim 1, wherein the sample signal light of the sample to be detected is collected by the objective lens and passes through the third non-polarizing beam splitter after being returned through the original illumination light paths.

6. The differential dark-field confocal microscopic measurement apparatus based on a polarized vector light beam according to claim 1, wherein the sample signal light emits the linearly polarized light through the third vortex wave plate, reflected light on the surface of the sample is removed through the polarizing plate, and only scattered light carrying the information of the sample to be detected is allowed to pass through the focusing lens, and to enter the single-mode optical fiber and the PMT detector for collection and detection.

7. The differential dark-field confocal microscopic measurement apparatus based on a polarized vector light beam according to claim 1, wherein during the same cycle, the PMT detector collects the scattering signals under the illumination of the radially polarized light in the first half cycle, and collects the scattering signals under the illumination of the azimuthally polarized light in the second half cycle, and super-resolution dark-field imaging results are obtained by identifying difference on the signals collected in each cycle.

8. A differential dark-field confocal microscopic measurement method based on a polarized vector light beam, and the method is implemented by the differential dark-field confocal microscopic measurement apparatus based on a polarized vector light beam according to claim 1, comprising the following specific follows: step a. emitting linearly polarized laser from the laser, having the linearly polarized laser passed through the first non-polarizing beam splitter, and modulated by the first acousto-optic modulator in the first half of each light field illumination cycle, in which case, the first acousto-optic modulator allows light beams to pass through, the second acousto-optic modulator prevents the light beams from passing through, so that only radially polarized light generated by the first half-wave plate and the first vortex wave plate achieves the illumination during the period; step b. emitting linearly polarized laser from the laser, having the linearly polarized laser passed through the first non-polarizing beam splitter, and modulated by the second acousto-optic modulator in the second half of each light field illumination cycle, in which case, the second acousto-optic modulator allows light beams to pass through, the first acousto-optic modulator prevents the light beams from passing through, so that only angularly polarized light generated by the second half-wave plate and the second vortex wave plate achieves the illumination during the period; step c. having the emitting diameter matched with the entrance aperture of the objective lens by regulating the magnification of the beam expander and the aperture size of the aperture diaphragm; step d. having the polarized vector light passed through the third non-polarizing beam splitter and being incident on the objective lens to form a focused light spot on the sample to be detected, and realizing the beam scanning of the sample to be detected by driving a three-dimensional moving stage; step e. having the sample signal light, after being returned through the original illumination light paths, collected by the objective lens and passed through the third non-polarizing beam splitter, and having the sample signal light regulated to be the linearly polarized light through the third vortex wave plate; step f. realizing removal of reflected light on the surface of the sample by controlling the polarization direction of the polarizing plate, only allowing the scattered light carrying the information of the sample to be detected to pass through the focusing lens, and to enter the single-mode optical fiber and the PMT detector for collection and detection; step g. during the same cycle, the PMT detector collects the scattering signals under the illumination of the radially polarized light in the first half cycle, and collects the scattering signals under the illumination of the azimuthally polarized light in the second half cycle; and step h. identifying differences on the scattering signals recorded by the PMT detector under the illumination of the radially polarized light and the azimuthally polarized light to obtain differential scattering signals.

* * * * *